Dec. 17, 1957    J. A. JENSEN    2,816,779
HOSE COUPLING WITH FLUID RESPONSIVE SEAL
Filed Sept. 15, 1953    2 Sheets-Sheet 1
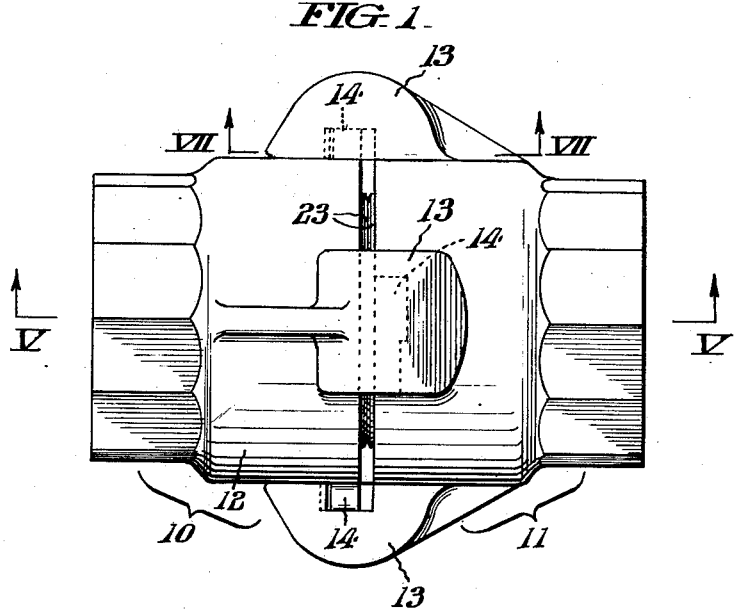
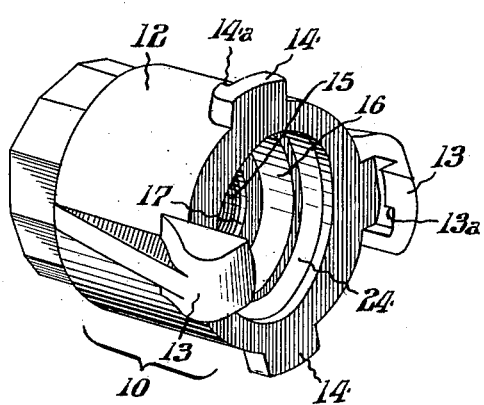
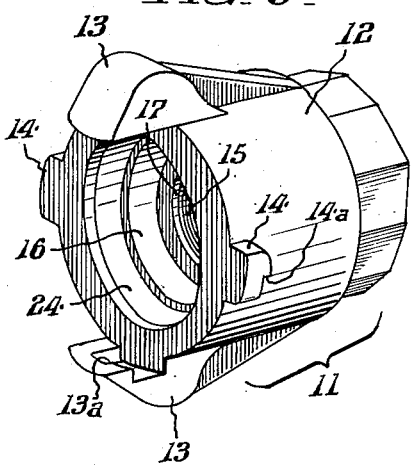
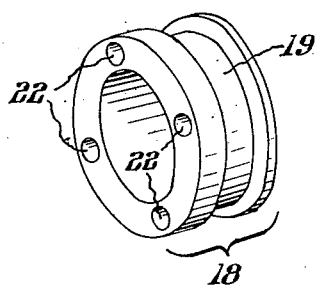
INVENTOR.
James A. Jensen,
BY Paul & Paul
ATTORNEYS.

Dec. 17, 1957  J. A. JENSEN  2,816,779
HOSE COUPLING WITH FLUID RESPONSIVE SEAL
Filed Sept. 15, 1953  2 Sheets-Sheet 2
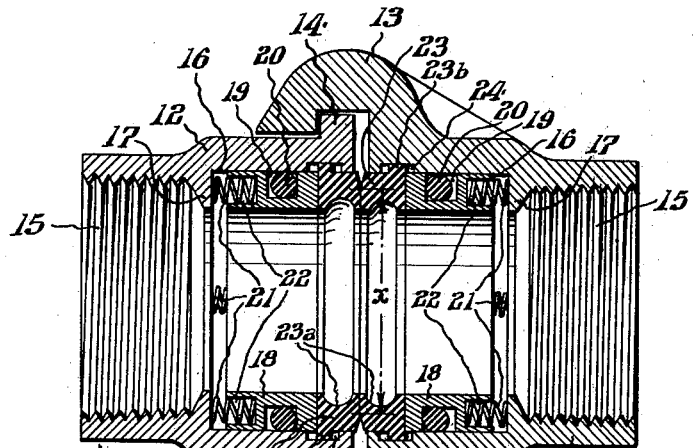
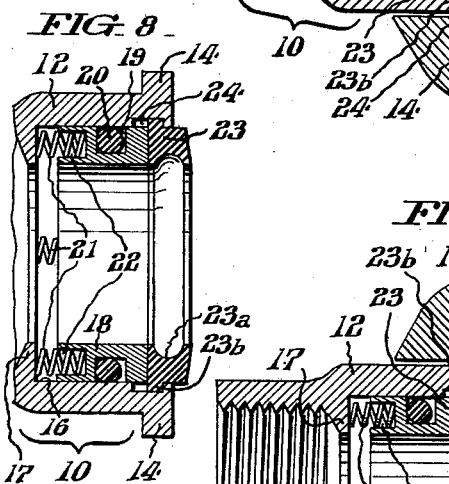
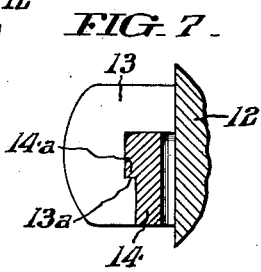
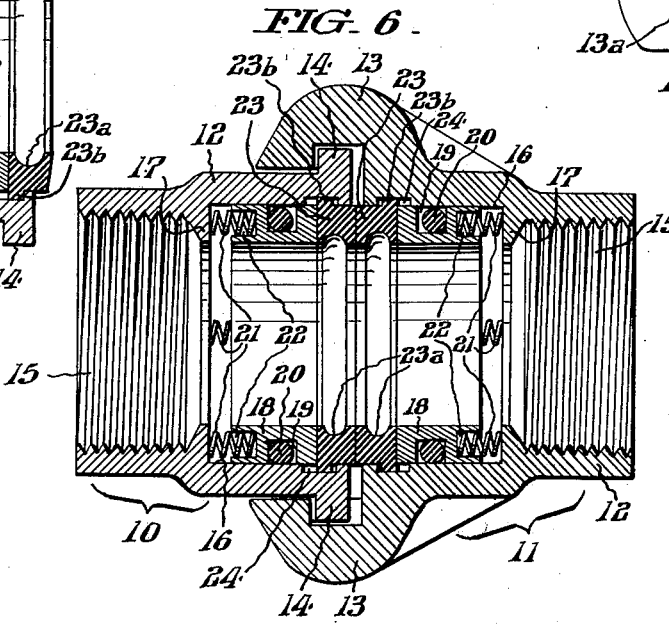
INVENTOR.
James A. Jensen,
BY Paul & Paul
ATTORNEYS.

United States Patent Office 2,816,779
Patented Dec. 17, 1957

2,816,779

HOSE COUPLING WITH FLUID RESPONSIVE SEAL

James A. Jensen, Haverford, Pa., assignor to Philadelphia Valve Company, a firm

Application September 15, 1953, Serial No. 380,167

1 Claim. (Cl. 285—74)

This invention relates to couplings for connecting sections of hoses or other types of tubing.

The chief aim of my invention is to provide a two part coupling which makes possible not only quick connection of two aligned hose or tube sections but disconnection as well, and having incorporated self-sealing means capable of responding to the pressure of fluid passing through the hose for maintenance of a perfect fluid tight seal.

Another aim of my invention is to attain the above advantages in a coupling which is simple in construction, and which lends itself to ready manufacture in quantity at small cost.

Other objects and attendant advantages will appear from the following detailed description of the attached drawings, wherein:

Fig. 1 is a view in elevation of a hose coupling conveniently embodying my invention.

Figs. 2 and 3 are perspective views of the two mating components of the coupling.

Fig. 4 is a perspective view of a piston element whereof one is associated with each component of the coupling.

Fig. 5 is an axial sectional view of the coupling taken as indicated by the angled arrows V—V in Fig. 1.

Fig. 6 is a view corresponding to Fig. 5 showing how the seal is maintained between the two components of the coupling with increase in the pressure of passing fluid.

Fig. 7 is a fragmentary detail section taken as indicated by the angled arrows VII—VII in Fig. 1 and Fig. 8 is a fragmentary view in axial section of one of the components of the coupling when disconnected from its mate.

As herein exemplified, my improved hose coupling comprises two mating components which are exact duplicates of each other and which are adapted to be permanently united respectively to the confronting ends of two hose sections (not illustrated). Since the two components are identical, the description immediately ensuing of one of them will hold for the other also.

Component 10 has a tubular body 12 of metal provided at one end with a pair of forwardly-extending diametrically-arranged radial shroud projections 13, and at right angles to said projections, a pair of radial lugs 14 whereof the outer faces are flush with the squared end face of said component. For a purpose later explained, the projections 13 are formed internally with shoulders 13a respectively, and the lugs 14 formed at the back with shoulders 14a. The rear portion of the body of component 10 is internally threaded as at 15 in Figs. 5 and 6 for the reception and security to the end of the corresponding hose section in an appropriate manner, and the outer end portion of the body is provided with a smoothly machined counterbore 16 which is separated from the threaded portion by an internal circumferential rib 17. Disposed within the counterbore 16 is an annular piston element 18 having a peripheral groove 19 wherein is lodged, with capacity for slight lateral freedom, a packing ring 20 of rubber or other resilient material. As shown, the ring 20 is circular in cross section and serves to maintain a fluid tight seal with the cylindric internal surface of the counterbore 16. A plurality of circumferentially-arranged helical compression springs 21 buttressed against the shoulder of the rib 17 and partly recessed into socket openings 22 in the rear face of said piston element, tend to urge the latter outwardly for maintenance in yielding engagement with an annular gasket 23 likewise of rubber or other resilient material. Gasket 23 is generally quadrangular in cross section, except for being internally grooved slightly as at 23a and for having at the rear, a peripheral flange 23b engaged in a retaining groove 24 provided internally of the bore 16 immediately inward of the square frontal end face of the body 12. It is to be particularly noted from Fig. 8 that when the component 10 is disconnected from its mate, the gasket 23, projects well outward beyond the end face of said component with its flange 23b stopped against the forward end of the retaining groove 24, and moreover that the exposed face of said gasket is sloped radially outwardly and rearwardly somewhat.

In the use of the coupling, component 10 is first brought up to component 11, end for end, with the projections 13 of the one overreaching the body of the other component in the interval between the projection 13 and lugs 14 of said other component. The two components are thereupon pressed toward each other in opposition to the resistance of the springs 21 which act upon piston elements 18 and upon the gaskets 23, and finally turned relatively through a partial rotation until the lugs 14 of the one are locked within the hollows of the projections 13 of the other through interengagement between the shoulders 13a and 14a of said projections and said lugs as instanced in Fig. 7. It will be noted from Fig. 5 that the springs 21 operate to maintain the interlock between the two components 10 and 11 after the latter are connected, as just explained, and at the same time serve to maintain the outer faces of the gaskets 23 in sealing engagement.

It is to be particularly noted that the diameter at $x$ where the two gaskets 23 meet is less than the outside diameter of the piston elements 18, and that only the areas of the seal faces beyond the diameter $x$ are exposed to the atmosphere. Accordingly, the force of the pressure of passing fluid tending to urge the elements 18 toward each other is greater than that tending to separate them. The differential between the areas of the two aforesaid diameters thus constitutes the net areas effective in causing the elements 18 to be forced against the gaskets 23. As an example, let it be assumed that the outside diameter of each piston element 18 is 2 inches, and the area 3.14 sq. in., and that the diameter at x is 1.68 and the area 2.22 sq. in., the difference therefore being .92 sq. in. With these proportions and a fluid pressure of ten lbs., the force exerted will be 10 x .92 or 9.2 lbs., while under a fluid pressure of 100 lbs., the force exerted will be 100 x .92 or 92 lbs. Thus it will be seen that the effectiveness of the seal increases in direct proportion to the increase in the pressure of the fluid passing through the coupling, and, moreover that the gaskets 23 will be distorted and the outer faces thereof will be brought into contact over their entire areas.

Having thus described my invention, I claim:

As a new product of manufacture, a hose coupling comprising two identical mating tubular components adapted to be secured respectively to the ends of two hose sections which are to be united, each such component having a pair of internally-shouldered diametral radial shroud projections to interlock with complementally shouldered intervening diametral radial lugs on the mating component upon inter-engagement and partial relative rotation of the components; internally-grooved annular sealing gaskets of resilient material respectively having circumferential flanges engaged in somewhat wider annular grooves internally of the bores of the components, the end portions of said gaskets having beveled faces and normally projecting outward somewhat from the ends of the components; circumferentially-grooved annular backing piston elements within the bores behind the sealing gaskets with their rear ends exposed for action thereupon by pressure of fluid passing through the coupling; resilient sealing rings circular in cross section lodged respectively in the circumferential grooves of the piston to seal fluid tight against the surfaces of the bores in said components; a plurality of relatively light circumferentially arranged helical compression springs influential upon the piston elements from the rear.

References Cited in the file of this patent

UNITED STATES PATENTS

| | | |
|---|---|---|
| 442,809 | Hunter | Dec. 16, 1890 |
| 1,020,210 | Lobnitz | Mar. 12, 1912 |
| 1,300,414 | Klell | Apr. 15, 1919 |
| 1,971,578 | Richardson | Aug. 28, 1934 |
| 2,046,724 | Buffington | July 7, 1936 |
| 2,071,750 | Kusebauch | Feb. 23, 1937 |
| 2,132,506 | Allen | Oct. 11, 1938 |
| 2,461,705 | Stranberg | Feb. 15, 1949 |

FOREIGN PATENTS

| | | |
|---|---|---|
| 105,251 | Austria | Aug. 15, 1926 |